Nov. 4, 1941.　　　J. K. MATSUMOTO　　　2,261,742
ELECTRIC CABLE
Filed Feb. 24, 1939　　　2 Sheets-Sheet 2
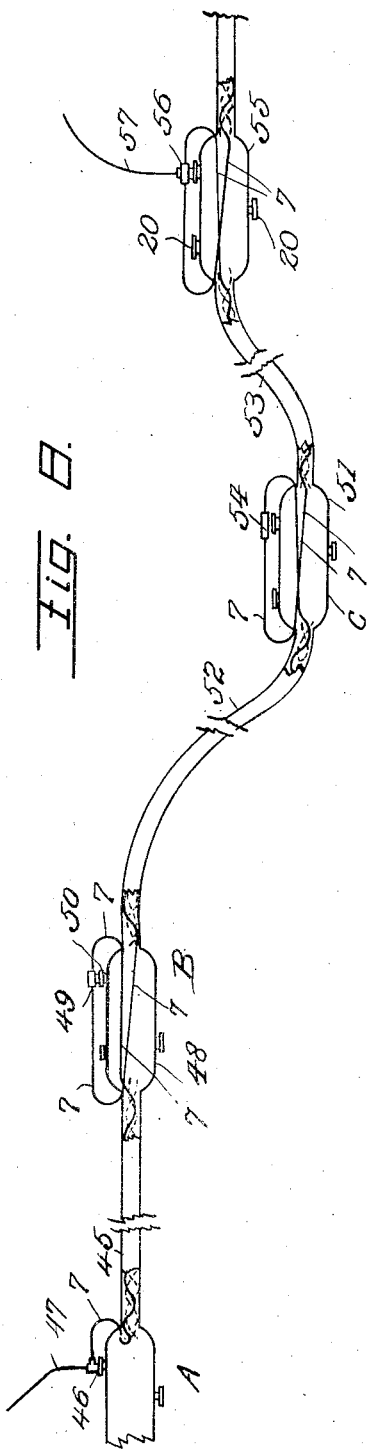
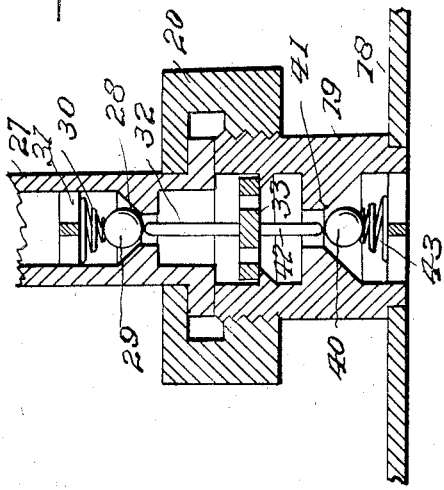
Inventor
Javins H. Matsumoto
By
Attorney Patented Nov. 4, 1941

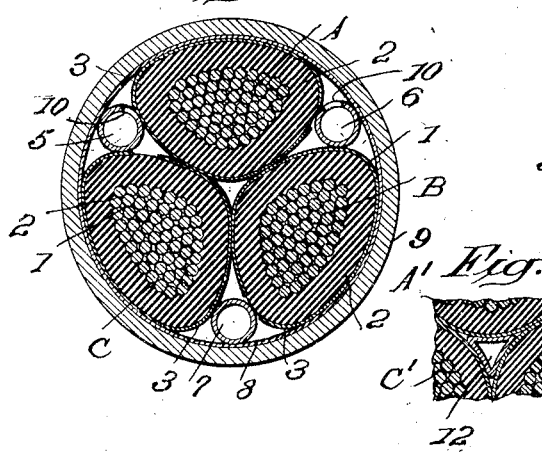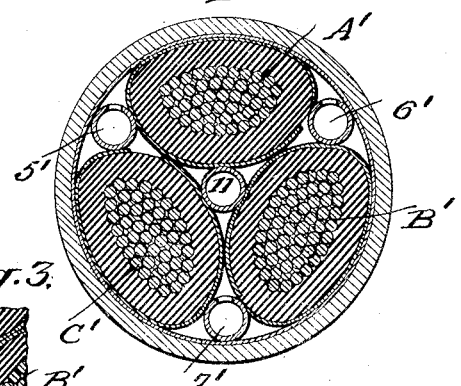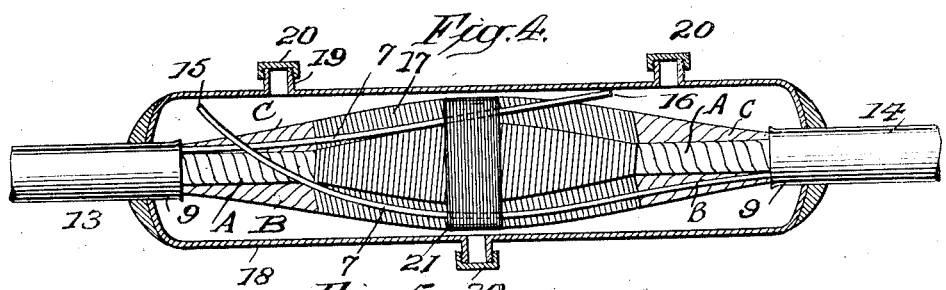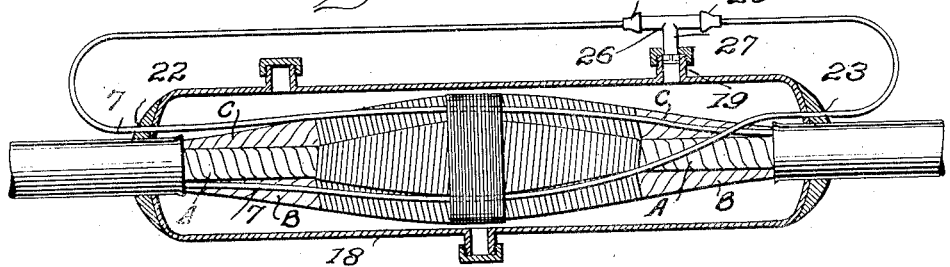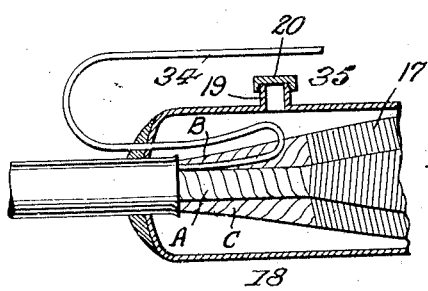

2,261,742

UNITED STATES PATENT OFFICE 2,261,742

ELECTRIC CABLE

Javius K. Matsumoto, New York, N. Y., assignor to Consolidated Edison Company of New York, Inc., a corporation of New York Application February 24, 1939, Serial No. 258,303

9 Claims. (Cl. 174—21)

This invention relates to improvements in high tension electric cables and more particularly to improvements in such cables of the so-called gas filled type.

It is an object of the invention to provide a practicable high tension gas-filled cable realizing the theoretical advantages of such a cable to the fullest degree in the maintenance of suitable gas pressure throughout the length of the cable so as to exclude foreign substances such as air and water and secure the protective action of gas under pressure in quenching ionization and sealing faults.

It is a further object of the invention to conserve manhole space and reduce expense of equipment by eliminating the need for a number of ballast tanks or indicators spaced along the cable. It is a further object of the invention to reduce servicing expense by providing a reliable central indication of the presence of gas leaks in a cable.

It is a further object of the invention to reduce the need for periodic blowing of the cable and draining of impregnating compound to clear the gas passages.

It has been known practice in the art for some time to maintain oil under pressure in a cable with the object of excluding foreign substances and quenching and sealing faults in the cable. Oil-filled cables, however, are expensive both because of the need of special refinement and treatment of the oil together with expert servicing and because of the need for ballast tanks spaced along the cable to take up oil when the pressure in the cable rises due to load conditions or changes in temperature, and to supply oil when the pressure decreases. In an attempt to provide a less expensive and more easily serviced cable, gas-filled cables have been employed. In these cables gas such as nitrogen is maintained under pressure in place of oil with the object of eliminating the defects referred to. It is found, however, that the maintenance of proper gas pressure in a long cable requires the use of many auxiliary gas tanks, the number depending upon the length of the cable and the extent to which it is required to travel at different elevations. Illustrating present practice, it has been found desirable to provide a cable a little more than two miles long with as many as seventeen gas reservoir locations, while the employment of the present invention should reduce the number of these locations to a maximum of two. It has also been attempted to provide a long cable with but one source of gas supply. For example, in a relatively straight cable of 4500 feet length gas has been supplied at one end and an indicator mechanism attached to the other. Tests along the cable have demonstrated, however, that pressure is not maintained uniformly and accordingly safety requires constant servicing. In none of the existing installations does the pressure at the cable terminal indicate satisfactorily the presence of a leak as soon as it occurs, so that it is quite possible for a fault to proceed to the point of admitting water in a flooded manhole before any indication is provided.

According to present practice, the upper limit of desirable gas pressure in a cable is set with relation to the strength of the outer sheath and the lower limit is set with a view to insuring the exclusion of foreign substances should a leak occur and to maintaining sufficient pressure to quench and seal ionization faults. In this connection it has been found that when a cable is maintained under pressure, whether with oil or inert gas such as nitrogen, the passage of current through an ionization fault is immediately quenched and secondly a waxy substance is formed which seals the fault. In view of these considerations it is desirable to maintain the minimum gas pressure at the highest possible value relative to the maximum consistent with safety. The present invention provides for a gas-filled cable eliminating the various defects of present constructions adverted to above, and providing central pressure indication and control with a minimum of construction and service expense.

It will, of course, be understood that a cable of the type with which the present invention is concerned is made up in effect of cable sections, the meeting ends of which are joined to complete the cable. The present invention is concerned with the cable sections which, of course, may be of varying lengths according to conditions and circumstances.

With this in view, the primary object of the invention is the provision of means whereby the respective ends of the cable section are subjected to a substantially identical pressure of the inert gas, with such pressure delivered from a single source of supply in order that the pressure within the cable due to gas distributing elements may be maintained constant throughout the length of any one section and throughout the length of connected sections, so that leakage and faults in the cable section and at the ends thereof and loss or reduction of pressure within the cable is prevented without the necessity of independent gas supplies under pressure for the respective ends of the cable section.

With the foregoing objects, as well as others which will appear in the specification, in view, the invention consists in the combinations and arrangements of parts and details of construction which will now first be described in connection with the accompanying drawings and the invention then pointed out more particularly in the appended claims.

In the drawings:

Fig. 1 is a cross section of a cable constructed according to the invention;

Fig. 2 is a view similar to Fig. 1 showing a modified form of cable also constructed according to the invention;

Fig. 3 is a fragmentary view similar to Fig. 2 and showing still another modification;

Fig. 4 is a longitudinal section on a smaller scale through a joint of a cable constructed according to the invention;

Fig. 5 is a view similar to Fig. 4 but showing a modified form of joint according to the invention;

Fig. 6 is a fragmentary view similar to Fig. 5 and showing a modified method of making the connection between gas conducting passages in a joint of the character of that of Fig. 5;

Fig. 7 is an enlarged fragmentary view of a portion of Fig. 5 showing a check valve used for connecting a gas conducting passage to a joint casing; and Fig. 8 is a diagrammatic view illustrating the cable sections, the cable conductors and splicers being eliminated.

Referring now to Fig. 1 illustrating a preferred embodiment of the invention in connection with a three-conductor three-phase cable, conductors A, B and C, each formed of a plurality of wires 1, are enclosed in insulation 2 which may be helically wound paper according to present practice and is saturated with impregnating compound, usually fluid at the contemplated operating temperatures. Each of these conductors is further provided with a helically wound electrostatic shield 3. These conductors, as described, are laid up helically according to present practice to form a cable and either in the laying-up operation, or later, gas conducting passages 5, 6 and 7 are laid up in the spaces between conductors, as shown. The entire structure is now provided with a binder tape 8 usually metallic and covered with an impervious outer sheath 9. As thus far described, the cable of the invention does not differ from present gas-filled cables and differs from oil-filled cables only in that the conducting passages in the assembly are supplied with gas instead of a liquid.

The gas conducting passages 5 and 6 are formed in accordance with present practice in gas-filled cables, consisting of helically wound sheet metal and having helical openings 10 in their walls. It will be understood that they may be formed in any other method common to the art in oil-filled or gas-filled cables so as to provide passages with openings along their walls to furnish communication between the interiors of the passages and the cable generally. In constructing the third passage 7, however, I depart from present practice and provide a continuous fluid-tight tubular passage 7 of either metallic or non-metallic construction. The provision of such an interior continuous fluid-tight gas passage is an important feature of the present invention.

Another preferred embodiment of the invention is illustrated in Fig. 2 in which parts corresponding to those of Fig. 1 are identified by similar reference numerals with the addition of a prime superscript and which differs therefrom only in the following particulars: The passage 7', instead of having a solid wall as does the passage 7 of Fig. 1, is made open walled similarly to the passages 5' and 6' and a continuous fluid-tight tubular means or a solid walled passage 11 is provided in the central opening between the conductors A', B' and C'. In this case, the continuous fluid-tight tube or solid walled passage, due to the central location, may be comparatively straight instead of being of helical form.

As shown in Fig. 3, the gas passage may be given practically any desired form and in particular may take the form of a roughly triangular tube 12 substantially filling the space between conductors A', B' and C', thus securing the maximum cross section for this passage.

Any of the cables according to Figs. 1, 2 or 3 may be employed in building a complete cable structure according to the invention, and the complete cable structure will accordingly be described principally with reference to Fig. 1.

Referring now to Fig. 4, which illustrates a cable joint according to the invention, a pair of cable sections 13 and 14 are joined in the following manner: The lead sheath 9 of the two cables as well as the gas passages 5 and 6 are cut back to the points 15 and 16, the conductors A, B and C are partially laid bare in accordance with usual practice and are joined with connectors by soldering or pressing, as at present, and wrapped with insulation and covered with metallic tape 17 which in turn is electrically connected to shielding tape 8 in accordance with present practice. The splice thus formed is enclosed in a joint casing 18 of conventional character and having nipples 19 with closures 20 for drainage, attachment of indicators or the like. The continuous fluid-tight tubular gas passages 7, however, are not cut off but are brought up to the upper part of the joint so as to be above any impregnating compound which may collect in the joint due to drainage from cable and are fastened in this position by a binding 21 which also serves to hold the completed splice together within the joint casing.

At the cable terminal the usual gas equipment (not shown) is attached. This will typically consist of a nitrogen gas cylinder with reducing valve, a safety valve, a pressure indicator and an alarm arranged to indicate the falling of the pressure below a certain minimum or its increase above a desired maximum. It will be understood that a cable structure according to the invention will as at present consist of a number of continuous cable lengths connected to each other through joints according to the invention at manholes. In a typical cable of 15 kv. rating, the continuous cable sections will range up to about four or five hundred feet in length, the length of each section being determined by the character of the ducts and the number of bends in the course of the duct, and being, in general, made as long as possible consistent with protection of the cable from undue abuse in pulling through the ducts. The cable structure will necessarily include, as at present, high points at points of support and low points between such points of support and will also have high and low points due to changes in the elevation of the ducts themselves to conform to the contours of the location and to avoid obstacles.

In previous gas-filled cables it has been found that impregnating compound will collect in the gas-passages at low points of the cable, often completely blocking these passages. This blocking may be so serious that pressure at one end of the cable where a leak occurs may fall as low as ¼ pound while the pressure at the other end remains at the value of 10 pounds for a period of hours. It is obvious that under such conditions water pressure in a flooded manhole could well become sufficient to cause water to enter the cable long before any indication of the presence of a leak was had. It is also clear that under such conditions destructive ionization could well occur, as the required quenching and wax-forming pressure would not be present. In a cable constructed according to the present invention, however, the interiors of all joints are maintained at a substantially constant equal pressure by means of the continuous fluid-tight gas passages 7. Between joints it is possible for impregnating compound to collect as in the past, but the maintenance of the desired pressure in the joints on either side will maintain such pressure also in the impregnating compound itself. Should a plurality of deposits of insulating compound form between joints, no undue fall of pressure can occur as each deposit can cause a drop in pressure of no more than a fraction of a pound and the total effect of a number of such deposits between joints will not produce a decrease in pressure at any point in excess of permissible variation. Should a leak occur at any point along the cable, it will be immediately detected at the source of gas supply since this source of gas supply is connected directly to the section in which the leak occurs through the continuous fluid-tight tubular gas passages 7 and the open interiors of the joints.

Another and improved form of joint according to the invention is illustrated in Fig. 5. In this case the continuous fluid-tight tubular passages 7 are brought out through the casing walls at 22 and 23, being extended by adding tubing sections as desired to provide the necessary length, and are joined to the arms 24 and 25 of a T 26. The stem 27 of the T is inserted in the cap 20 of one of the nipples 19 and is provided with a check valve shown diagrammatically in Fig. 7 as comprising a seat 28, a ball 29, a spring 30 and spring supporting rib 31. The nipple 19 is provided with a pin 32 to engage ball 29 and supported on a cross strut 33. In this embodiment the gas passages 7 communicate with each other through the arms 24 and 25 of T 26 and with the interior of the joint 18 through stem 27 and nipple 19. The operation of a cable structure with joints according to Fig. 5 is the same as that described in connection with Fig. 4. The structure is provided with a second valve 40, cooperating with a seat 41 and engaged by an extension 42 of stem 27 to be held open against a spring 43. The valve 40 is normally open to permit gas under pressure to enter joint member 18, but when cap 20 is unscrewed to permit valve 29 to close to by-pass the particular joint member 18, the valve 40 also closes to prevent leakage from the joint member. However, when it is necessary to open the joint the construction of Fig. 5 presents the advantage that the gas passage 7 can be shunted past the joint by merely unscrewing cap 20, permitting the check valve in the T 26 to close, thus facilitating repairs without undue loss of gas.

As shown in Fig. 6, a joint otherwise constructed according to the embodiment of Fig. 5 may be very simply formed by attaching extensions 34 to the passages 7 by means of elbows 35. In this case the extension 34 will be brought out through the end of the casing at which the tube 7 enters instead of the opposite end as shown in Fig. 5.

Ordinarily in a cable structure according to the invention a single source of gas supply at one end of the cable will be found sufficient. It will be understood, however, that in cables of great length or where unusual conditions of varying elevation or the like are encountered, one or more sources of gas supply may be added at intermediate points. In the making of repairs in present gas-filled cables, it has been found necessary to attach gas cylinders to the adjacent joints on each side of the joint which is to be opened to insure the constant flow of nitrogen into this joint with a view to preventing a pollution of the cable interior with air or moisture. According to the present invention, employing the embodiment of Fig. 4, it will ordinarily be necessary to attach such a gas cylinder only to one side of the joint which is being worked on and if two or three sources of gas supply are used in a long cable it will be unnecessary to attach any cylinder. When the embodiment according to Fig. 5 or Fig. 6 is employed, it will ordinarily be unnecessary to attach a gas cylinder at either side of the joint which is being opened due to the shunting of the gas supply across this joint.

While the complete cable structure has been described with reference to the type of cable illustrated in Fig. 1, it will be understood that cable sections according to Fig. 2 or Fig. 3 may be employed, the only difference being that in making the joint the open walled passages 5', 6' and 7' are cut off similarly to the passages 5 and 6 and the solid walled central passage 11 or 12 is brought out between the conductors within the joint and thereafter disposed similarly to the continuous fluid-tight tubular passages 7 as previously described. It will also be understood that a cable structure may be built up with different sections according to different forms as illustrated in Figs. 1 to 3 and with the joints between sections of any of the forms illustrated in Figs. 4 to 6.

The practical application of the improvement in connection with a length of cable is diagrammatically illustrated in Fig. 8.

The joint A of the cable may be a wiping casting of a cable terminal, a stop joint, or a cable joint such as is used in present gas-filled cable practice, the joint being adapted to join gas-filled cables with continuous fluid-tight tubular gas passages within the outer sheaths. Here the cable section 45 has the fluid-tight continuous tubular gas passage 7 leading to the outside of the joint and connected through a T fitting 46 to a source of gas supply through appropriate piping 47.

The joint B, which is a typical gas-filled cable joint designed to join gas-filled cables with continuous fluid-tight tubular gas passages within the outer sheaths, provides that continuous fluid-tight tubular gas passages 7 are brought to the exterior of the joint casing 48 and connected to one another through a coupling 49 forming part of a fitting 50 leading to the interior of the joint casing 48. The fitting is shown more particularly in Fig. 7 and the arrangement here is substantially that shown in Fig. 5.

The joint C provides a joint casing 51 through which the continuous fluid-tight tubular gas passages 7 from the cable sections 52 leading to the joint C and 53 leading from the joint C are led to the exterior of the joint casing 51 and connected beyond the joint through a coupling 54. This particular joint C illustrates the application of the improvement to a joint casing which, owing to conditions, is on a plane below the normal plane of the joint casing B in the continuity of the cable. Owing to the low condition of the cable 51 of joint C, it may not be advisable to connect the continuous fluid-tight tubular passages to the interior of such joint casing.

When connected as shown, the liability of the impregnating compound which drains from the cable conductor insulations into the joint entering into the continuous fluid-tight tubular passages is completely eliminated. Thus, this continuous tubular gas passage cannot be interrupted by the accumulation therein of such impregnating compound. Of course, if the liability of the compound entering the continuous fluid-tight gas passage in the lower joint, such as C, is remote owing to existing conditions, then the form of joint C may be identical with that of joint B.

The joint D is similar to joint B including a joint casing 55 from which the continuous fluid-tight tubular gas passages 7 are led to the exterior of the joint casing and connected by a coupling unit 56 similar to that shown in Fig. 7, with such unit connected by a pipe 57 to a gas reservoir or ballast tank.

The various joint connections shown in Fig. 8 indicate the practical application of the improvement to the various types of connections employed in a cable length, the various illustrations showing the different arrangements of the continuous fluid-tight tubular gas passages in typical joints which would be employed throughout a conventional cable length. The joints A and D form the terminals of the cable length, the joint B the conventional joint in the normal run of the cable length, and the joint C is typical of the arrangement provided where the joint is on a lower plane and particularly liable to the accumulation of the cable impregnating compound.

From the above construction, it will be apparent that the inert gas distributed under pressure throughout the full length of the cable section through the open walled conduits 5 and 6 may be subjected to a material reduction in pressure incident to accumulations within the conduits to cause the pressure at one end of the system to be materially below the permissible minimum and thus fail to afford the desired protection at such end. This objection is entirely overcome by the present invention while at the same time avoiding the necessity of a new pressure source at the cable section end liable to material pressure reduction. With and as a result of the present invention the inert gas under pressure entirely sealed against the interior of the cable section by a closed conduit, will deliver such inert gas under pressure and at substantially constant rating at both ends of the cable section and this from a single source of pressure located at any joint location of the cable sections to be protected. The pressure of the inert gas delivered through the closed conduit will of course provide a constant pressure medium for that end of the cable section or sections remote from the source of supply, so that notwithstanding a reduction in inert gas pressure in the open walled conduits 5 and 6, such gas pressure is effectively renewed or maintained at the end of the cable section by the medium of the by-pass delivery of the closed conduit 7 with practically no appreciable loss of pressure from that delivered by the source of supply.

What is claimed as new is:

1. In an electric cable structure, and in combination, a plurality of continuous cable sections each comprising an outer sheath and a plurality of conductors therein, insulation separating said conductors from each other and said sheath and comprising solid insulating material and insulating compound impregnating the same, open-walled gas pressure conducting means within said sheath the said gas conducting means introducing a constant pressure within and throughout the length of said sheath in the absence of obstruction in such means incident to the accumulation of insulating compound or the like therein in the use of the cable, fluid-tight gas conducting means within and extending beyond said sheath, said fluid tight gas conducting means maintaining a constant flow of gas under pressure throughout the full length of and to a point beyond the sheath, wholly regardless of any obstructive flow of the insulating compound, joints connecting said cable sections, and casings forming part of said joints, the open walled gas conducting means being fully open to the casings and the solid walled gas conducting means extending into the casing to and beyond the open end of the open walled gas conducting means, the ends of the solid-walled gas conducting means opening into the casings at points above the level of any possible accumulation of compound in said casings, whereby to avoid compound obstruction of free flow of gas from said solid-walled gas conducting means into said casings.

2. In an electric cable structure, and in combination, a plurality of continuous cable sections each comprising an outer sheath and a plurality of conductors therein, insulation separating said conductors from each other and said sheath and comprising solid insulating material and insulating compound impregnating the same, open-walled gas pressure conducting means within said sheath, the said gas conducting means introducing a constant pressure within and throughout the length of said sheath in the absence of obstruction in such means incident to the accumulation of insulating compound or the like therein in the use of the cable, continuous fluid-tight tubular gas conducting means within and extending beyond said sheath, joints connecting said cable sections, and casings forming part of said joints, said open-walled gas conducting means being open to the casing and said fluid tight gas conducting means extending into the casing beyond the end of the open-walled gas conducting means and terminating in the upper portions of said casing at a point above any possible level of compound accumulated in said casings, whereby to avoid any interruption of gas flow through gas-pressure conducting means into said casings.

3. In an electric cable structure, and in combination, a plurality of continuous cable sections each comprising an outer sheath and a plurality of conductors therein, insulation separating said conductors from each other and said sheath and comprising solid insulating material and insulating compound impregnating the same, open-walled pressure gas conducting means within said sheath, the said gas conducting means introducing a constant pressure within and throughout the length of said sheath in the absence of obstruction in such means incident to the accumulation of insulating compound or the like therein in the use of the cable, continuous fluid-tight tubular pressure gas conducting means within said sheath, said fluid-tight gas conducting means maintaining a constant flow of gas under pressure throughout the full length of and to a point beyond the sheath, wholly regardless of any obstructive flow of the insulating compound, joints connecting said cable sections, and casings forming part of said joints, said open-walled gas conducting means opening into the interior of said joint casings, and said continuous fluid-tight tubular gas passages extending beyond the open ends of the open-walled gas conducting means and through said joint casings to the exterior thereof, means external to said joint casings for interconnecting the fluid-tight tubular gas passages for open communication with such casings to insure free delivery of gas under pressure into said casings beyond any possibility of interruption from accumulation of insulating compound in said casings.

4. A gas filled cable system comprising conductors, coverings therefor including insulation, a compound impregnating the insulation, an enclosing imperforate sheath, the peripheral parts of the coverings on the conductors and the inner wall of the sheath defining normally open free feed gas conveying channels into which compound may enter, joints for uniting adjacent ends of the conductors, casings for the joints into which the channels open containing insulating gas under positive pressure, and a solid walled tube within the sheath opening at its ends into the joint casings above the level of any compound therein for conveying gas between them.

5. In a gas filled cable system comprising jointed lengths of cable, each cable length having conductors enclosed in an impervious sheath and covered with compound-impregnated insulation, impervious casings sealed to adjacent sheaths for connecting them and enclosing the joints between the conductors, free feed gas channels extending longitudinally through each cable length and into communication with the casings at the opposite ends of said cable length, and an imperforate tube extending longitudinally within each cable length and having its opposite ends in communication with the casings at the opposite ends of said cable length above any possible level of compound in said casings.

6. A gas filled cable system comprising jointed lengths of cable and having a part depressed below the general level of the system, each cable length having a conductor enclosed in an impervious sheath and covered with compound-impregnated insulation, impervious casings sealed to adjacent sheaths for connecting them and enclosing the joints between the conductors, a free feed gas channel extending longitudinally through each cable length and into communication with the casings at the opposite ends of said cable length, and an imperforate tube extending through the cable lengths on opposite ends of said depressed part to by-pass gas across said part and communicating with the casings on opposite sides of said part above any possible level of compound in said casings.

7. A gas filled cable system comprising conductors, coverings therefor including insulation, the conductors and their coverings being spirally arranged, impregnating compound for the insulation retained therein by capillary attraction, an enclosing sheath, the conductor coverings and the inner wall of the sheath defining normally free feed gas containing channels and into which compound oozing from the insulation may enter, joints uniting the conductor ends, casings for the joints containing insulating gas under pressure and into which compound may enter, and a solid walled open ended tube occupying one of the channels, the ends of the tube terminating in joint casings above the level of any compound therein for freely conveying gas between the joint casings.

8. A gas filled cable system comprising jointed lengths of cable, each having a conductor covered with insulation, impregnating compound for the insulation, an impervious sheath for each length, a free feed gas channel located within and extending longitudinally of each cable length, impervious casings sealed to adjacent sheaths for connecting them and enclosing the joints, a solid walled conduit extending lengthwise of the free feed channel in each length with its ends so arranged within two casings as to prevent any compound in the joint casings from entering it, the conduit by-passing any slugs of compound formed within the free feed channel, and a filling of insulating gas under positive pressure for the cable sheaths, joint casings and conduits, the gas being free to flow through the conduits from one length of cable to another to ensure an adequate supply of gas in all regions of the cable system.

9. An electric cable installation comprising a length of cable having a conductor, permeable insulation thereon, an impervious sheath therefor, a channel formed within the sheath extending from end to end thereof normally conveying gas to all parts of the insulation and also acting as a drain for the sheath normally to prevent accumulation of compound therein, a liquid compound for impregnating the insulation, an imperforate tube within the sheath extending lengthwise thereof and of the channel for by-passing gas around any slugs of liquid compound which may collect in low areas of the channel, the ends of the tube being so positioned that the compound does not have access thereto, and a supply of insulating gas under positive pressure for the channel and the tube.

JAVIUS K. MATSUMOTO.